US008856949B2

(12) United States Patent
Lin (10) Patent No.: US 8,856,949 B2
(45) Date of Patent: Oct. 7, 2014

(54) SYSTEMS AND METHODS FOR DETECTING AUTHORIZED PLAYERS (75) Inventor: Hung-Te Lin, Taipei (TW)

(73) Assignee: Cyberlink Corporation, Shindian, Taipei (TW)

( * ) Notice: Subject to any disclaimer, the term of this patent is extended or adjusted under 35 U.S.C. 154(b) by 1171 days.

(21) Appl. No.: 12/357,485

(22) Filed: Jan. 22, 2009

(65) Prior Publication Data

US 2010/0169663 A1 Jul. 1, 2010

Related U.S. Application Data (60) Provisional application No. 61/141,403, filed on Dec. 30, 2008.

(51) Int. Cl.
*H04L 29/06* (2006.01)
*G06F 21/10* (2013.01)

(52) U.S. Cl.
CPC ........................................ *G06F 21/10* (2013.01)
USPC ........................................................... 726/27

(58) Field of Classification Search
USPC .................... 726/27; 380/200; 713/165, 177
See application file for complete search history.

(56) References Cited

U.S. PATENT DOCUMENTS

| 2006/0136867 | A1* | 6/2006 | Schneider et al. ............ 717/106 |
| 2007/0065101 | A1* | 3/2007 | Takashima ...................... 386/94 |
| 2007/0094505 | A1* | 4/2007 | Futa et al. ..................... 713/176 |
| 2007/0116280 | A1* | 5/2007 | Takashima .................... 380/228 |
| 2007/0136282 | A1* | 6/2007 | Takashima ........................ 707/6 |
| 2007/0277245 | A1* | 11/2007 | Goto et al. ....................... 726/27 |
| 2008/0016576 | A1* | 1/2008 | Ueda et al. ....................... 726/26 |
| 2010/0100969 | A1* | 4/2010 | Yamaguchi et al. ............. 726/30 |
| 2010/0122079 | A1* | 5/2010 | Nakano et al. ................. 713/156 |
| 2010/0138665 | A1* | 6/2010 | Kusudo et al. ................ 713/181 |

* cited by examiner

*Primary Examiner* — Ali Abyaneh
(74) *Attorney, Agent, or Firm* — McClure, Qualey & Rodack, LLP (57) ABSTRACT

One embodiment includes method for determining whether a player application is authorized to play protected content. The method comprises reading a digital signature associated with the player application from a predetermined memory location using a protection interface associated with the player application, where the digital signature comprises one or more file designations. The embodiment further comprises mapping, by the protection interface, the one or more file designations to one or more files associated with the player application and transmitting mapping information from the protection interface to a verification application stored on a storage medium. The verification application is configured to determine whether the player application is authorized to play the protected content if the one or more file designations match the one or more files based on the mapping information.

25 Claims, 7 Drawing Sheets

SYSTEMS AND METHODS FOR DETECTING AUTHORIZED PLAYERS

CROSS-REFERENCE TO RELATED APPLICATION

This application claims priority to, and the benefit of, U.S. Provisional Patent Application entitled, "SYSTEMS AND METHODS FOR DETECTING AUTHORIZED PLAYERS," having Ser. No. 61/141,403, filed on Dec. 30, 2008, which is incorporated by reference in its entirety.

TECHNICAL FIELD

The present disclosure generally relates to multimedia content and more particularly, relates to detecting authorized players of media content.

BACKGROUND

Over the years, digital video content has gained increasing popularity with consumers. With the increasing amount of audio and video content available to consumers through broadcast, cable, on-demand, fixed media, and other available sources of multimedia content, consumers have access to an increasing amount of content and programming. Furthermore, many devices (e.g., PCs, DVD recorders) and services that are readily available allow consumers to record, time-shift or view on-demand video and audio content.

Video playback systems are well known, and there are a variety of current standards that govern the format and other attributes associated with the various video playback systems. Today, the DVD (Digital Video Disc) standard is the predominant format utilized for optical disc storage because of its high storage capacity, thus enabling high quality video and audio to be stored. Consequently, media content such as movies, television shows, and music videos are made widely available in DVD format.

Blu-ray Disc offers advantages over DVDs and other previous optical standards in various ways including increased storage capacity and enhanced interactivity (disc content authoring, seamless menu navigation, network/Internet connectivity, etc.). The Blu-ray Disc framework offers content providers almost unlimited functionality when creating interactive titles. The author has complete freedom in designing the user interface, which is controllable by using standard navigational buttons on a remote control. As such, Blu-ray Disc provides greater levels of user control and interactivity involving the underlying video content.

Unfortunately, piracy of audio/visual works continues to proliferate as hackers facilitate the unauthorized distribution of multimedia content. Because of the capability in accessing and copying multimedia content stored on DVDs, for example, video and audio piracy continues to be an ongoing problem. Such piracy continues to be a problem even in light of the copy-restricted mechanisms that DVDs generally employ.

SUMMARY

Briefly described, one embodiment, among others, includes a method for determining whether a player application is authorized to play protected content. The method comprises reading a digital signature associated with the player application from a predetermined memory location and determining whether the player application is authorized to play the protected content based on the digital signature. The digital signature contains one or more disk file designations and one or more image file designations.

Another embodiment is a system for determining whether a player application is authorized to play protected content. The system comprises a verification application configured to determine whether a player application on a viewing apparatus is authorized to access media content by examining a digital signature. In accordance with such embodiments, the verification application reads the digital certificate from a predetermined memory location in the viewing apparatus. The digital signature contains disk file designations and image file designations associated with the player application.

Another embodiment is a computer readable medium storing a computer program for execution on a processor. The computer program comprises computer executable instructions configured to read a digital signature associated with the player application from a non-volatile memory in a viewing apparatus and determine whether a player application on the viewing apparatus is authorized to play protected content based on the digital signature. The digital signature contains one or more disk file designations and one or more image file designations.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In response to unauthorized copying and distribution of multimedia content, publishers and authors of audio/visual works have relied on various technologies that control access to digital content. BD+ is a component of the Blu-ray Disc Digital Rights Management system which was developed by Cryptography Research Inc. (CRI). BD+ is a small virtual machine (VM) embedded in authorized players that allows content providers to include executable programs (e.g., a BD+ program) on Blu-ray Discs. Such programs can examine the host environment to see if the player has been tampered with.

In general, every licensed playback device manufacturer provides the BD+ licensing authority with memory footprints that identify their devices. Such programs can also verify that the player's keys have not been changed. The programs can also limit playback of a Blu-Ray disc to the first device in which the disc is played. If a playback device manufacturer finds that its devices have been hacked, it can potentially release BD+ code that detects and circumvents the vulnerability. These programs can then be included in all new disc releases.

Each BD+ licensed BD-ROM player is issued BD+ signatures and a certificate that is signed by a BD+ licensing authority. The security check performed by the VM matches the player's BD+ security keys with the player's certificate. This check insures that keys have not been compromised or stolen from another playback environment and inserted into the environment being checked. Once the keys and certificates have been checked, the VM examines the player's playback environment. Each player manufacturer must provide the BD+ licensing authority with a memory footprint that can be used to identify their playback environment.

Various embodiments are described for detecting authorized player applications. In accordance with some embodiments, the digital signatures described above are constructed based on one or more files or tags. A designation list file of the locations of these files or tags, when loaded into memory, is generated. This list of memory locations is encrypted and signed. Upon installation of a BD software player, this list of memory locations is also installed. During playback, the list is loaded by a BD+API (application programming interface), for example, verified, and decrypted by a BD+ program (or verification application), which may be pre-stored on a storage medium such as a Blu-ray disc or other optical disc. The BD+ program then calls an API (e.g., DiscoveryRAM) or a protection interface coupled to the player application to verify if the tags are in their correct memory positions. That is, the memory locations in the list are compared to the actual memory locations of the tags to determine whether they match.

Various embodiments are thus described for generating digital signatures based on static disk files, image files associated with the target, or a combination of both. In this case, the target is the player application being evaluated. In this regard, the digital signatures actually identify the player application they are assigned to. A description of the various components of a system for determining whether a player application is authorized to play protected content is described below, followed by a discussion of the operation of these components. One embodiment is generally implemented on a storage medium, such as a Blu-ray disc or other optical disc. For purposes of illustration, the functionality of a verification application stored on a Blu-ray disc is described in connection with a player application and protection application executed on a viewing apparatus such as a computer.

Figure 1:
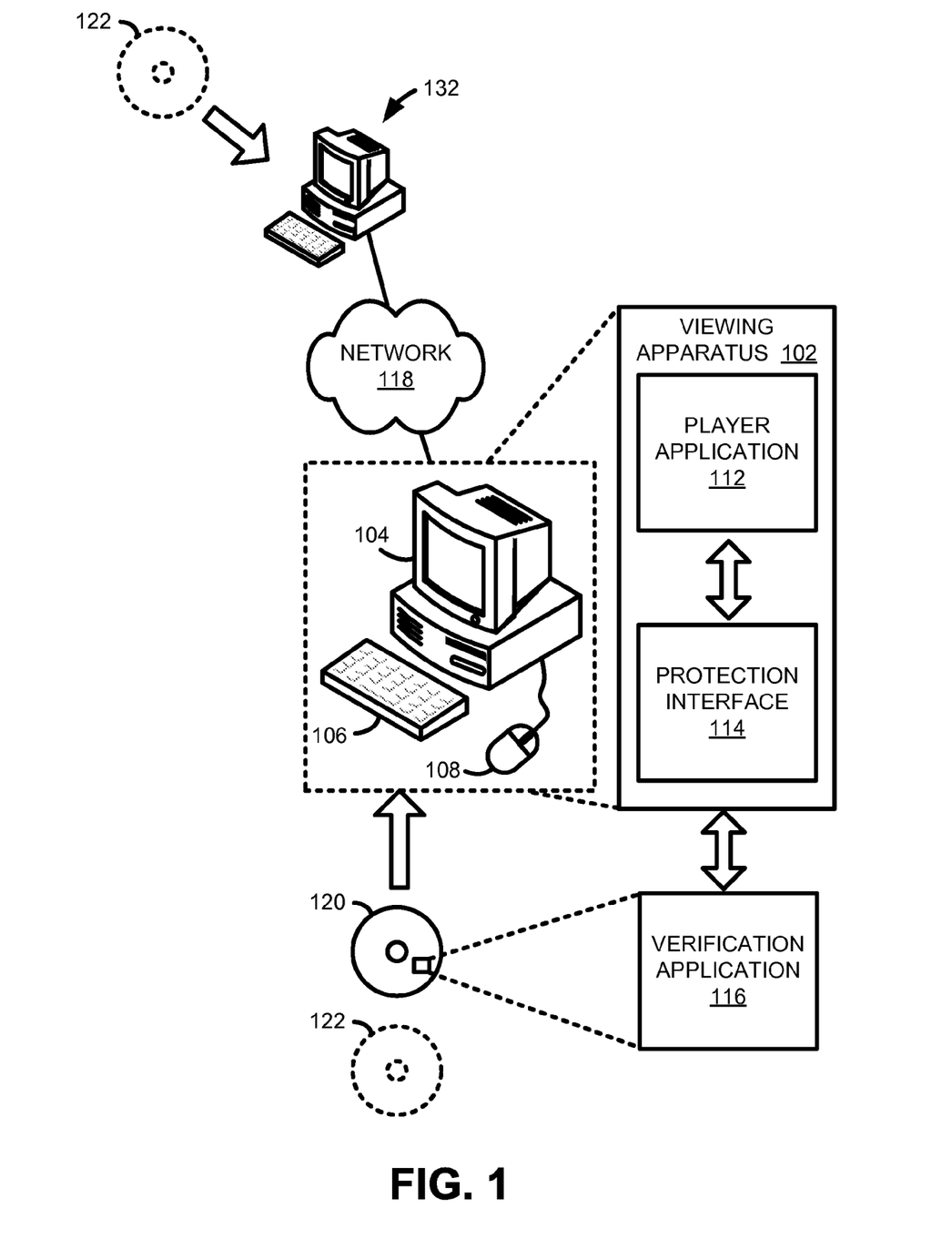
FIG. 1 depicts a top-level diagram of a system according to an embodiment of the present disclosure for determining whether a player application is authorized to play protected content.

With reference to FIG. 1, a system for determining whether a player application is authorized to play protected content is shown. For some embodiments, the system may include a verification application 116 stored on a storage medium 120 such as a Blu-ray disc (BD) or other optical disc. As described above in connection with the BD+ framework, the verification application 116 may be a virtual machine (VM) running within the BD-ROM playback engine, as those skilled in the art will appreciate. The verification application 116 may also be an executable file.

In accordance with some embodiments, the verification application 116 may be embedded into authorized copies of a Blu-ray Disc 122. These authorized copies are protected by AACS (Advanced Access Content System), which is a standard relating to content distribution and digital rights management. The viewing apparatus 102 is configured to obtain authorization for creating or downloading a authorized copy by contacting a designated server on the Internet. To protect against unauthorized distribution of media content, authorized copies are protected by DRM (digital rights management) such that uncontrolled copying is prevented.

The verification application 116 interfaces with a viewing apparatus 102, which may be, for example, a computer workstation, laptop or other computing device. The viewing apparatus 102 receives the storage medium (e.g., BD disc) 120 storing the verification application 116 via an optical disk drive or other means. The viewing apparatus 102 may include a display 104 and input devices such as a keyboard 106 and a mouse 108. Furthermore, the viewing apparatus 102 may be configured to provide a user interface, which a user utilizes to select movie titles to view or to access interactive features stored on the storage medium 120.

The viewing apparatus 102 includes a player application 112 and a protection interface 114. The player application 112 is utilized to play back media content stored on the storage medium 120. Before the player application 112 can access the media content stored on the storage medium 120, however, the verification application 116 performs a check to determine if the player application 112 is authorized to access the protected media content. Specifically, the verification application 116 interfaces with the protection interface 114 to determine whether the digital signature associated with the player application 112 is valid.

Figure 2A:
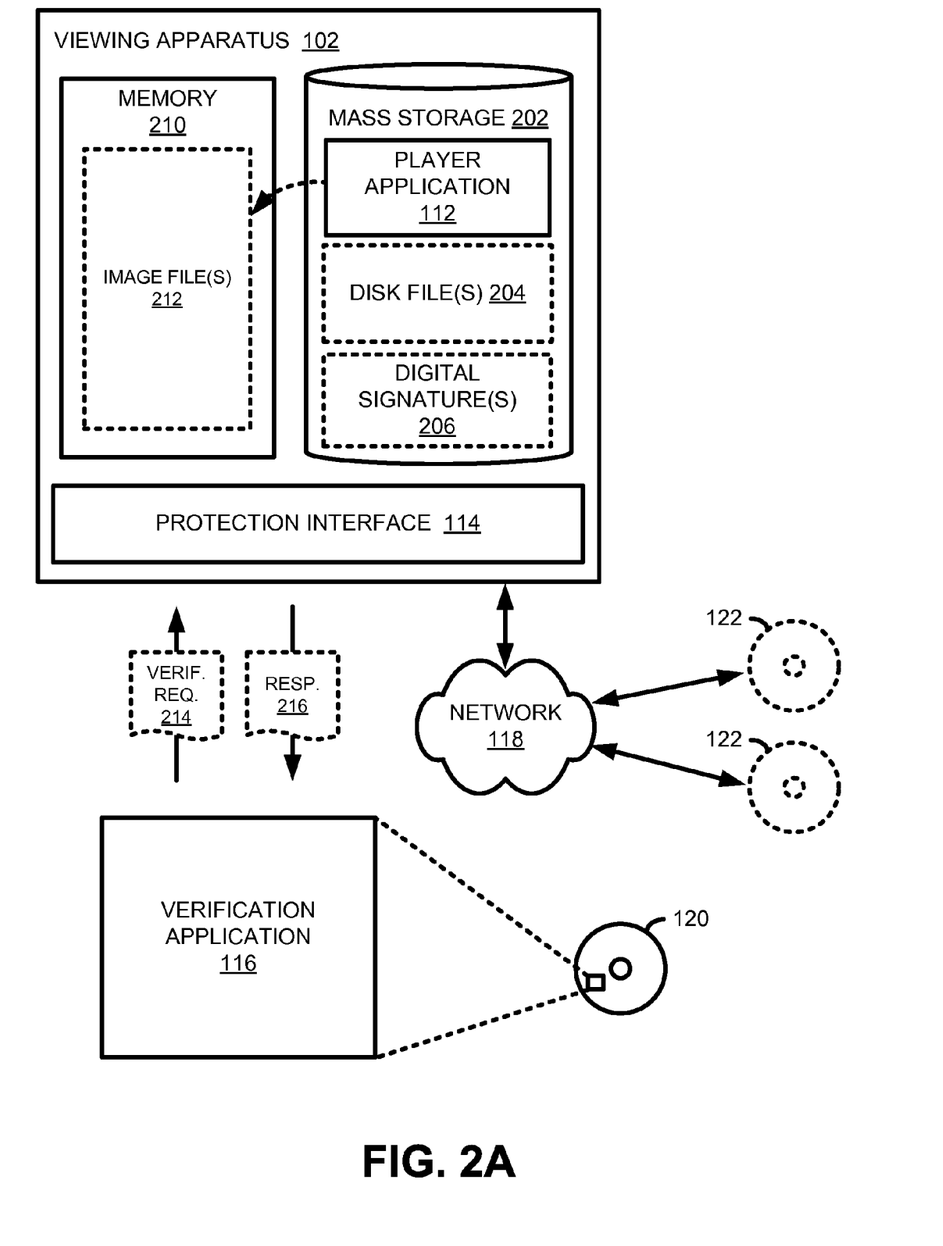
FIGS. 2A-C provide an example illustration of a verification application interfacing with the viewing apparatus in FIG. 1 according to an embodiment of the present disclosure.

Reference is made to FIG. 2A, which depicts a block diagram for an example illustration of a verification application interfacing with the viewing apparatus in FIG. 1 according to an embodiment of the present disclosure. The viewing apparatus 102 shown in FIG. 1 may include a memory 210 and a separate mass storage device 202 such as a hard disk drive for storing one or more disk files 204 associated with the player application 112.

As one skilled in the art will appreciate, the installation of an application or program may involve a large number of files. Many programs are supplied in a condensed form when distributed. In order to be used, the programs are first unpacked and relevant files and information are placed on the computer, taking into account variations between computers and any customized settings required by the user. During installation, the computer is configured to store relevant files and any necessary settings required for that program to operate correctly. Such files may include, for example, configuration files, shortcuts, and data files. The files may also include executable files and other binary files. Generally, such files are installed to a particular location on a hard disk drive or other mass storage device 202. Several hundred files 204 may be involved during an installation. For some embodiments, a portion of these files (e.g., twenty files) may be utilized to generate a digital signature 206.

For purposes of this disclosure, the term "image file" 212 refers to a file loaded from a hard disk to memory for execution. Further the image file 212 can be regarded as an image of a disk file or loaded form of the disk file. The image file 212 represents a portion of the memory for execution. As one of ordinary skill will appreciate, within a computing environment, files stored on a hard disk undergo various changes when these files are loaded to memory for execution. As non-limiting examples, these image files may be moved to a new memory location (relocation) or de-compressed (if the files are originally in a compressed form). By way of illustration, the player application 112 may be stored in a compressed form with a file size of approximately 500 kB when stored in the mass storage device 202. When the player application 112 is loaded into memory 210 for execution, however, the size of the image file 212 may expand up to 2 MB.

It should be further noted that for some implementations, protection mechanisms may also be executed during this loading process. One protection mechanism is directed to checking for the presence of a debugger in the system while loading a file to memory. Another protection mechanism involves checking for the presence of malicious software designed to dump portions of code or to log data. For some embodiments, execution authority may also be checked to determine whether authorized components are being executed. Some embodiments may also involve checking the integrity of the binary code (after the file is loaded) or scrambling the binary code. As another protection mechanism, the file may be initially encrypted and decrypted when being loaded into memory for execution.

As such, for exemplary embodiments, both disk files (i.e., those files stored on the hard disk) 204 and image files 212 are utilized to create a digital signature 206 during creation of the player application 112. For purposes of this disclosure, disk files and may also be referred to as "static files" as these disk files generally reside in static memory. In accordance with exemplary embodiments, disk files and image files of the player application 112 are used to create a digital signature 206, which is later used to determine whether the player application 112 is an authorized player. In some implementations, the digital signature 206 contains both disk file designations and image file designations which are later examined to determine whether the player application 112 has been tampered with, copied without authorization, etc. For some embodiments, the digital signature 206 may be created using a predetermined algorithm such as a checksum algorithm or other algorithm.

Figure 3:
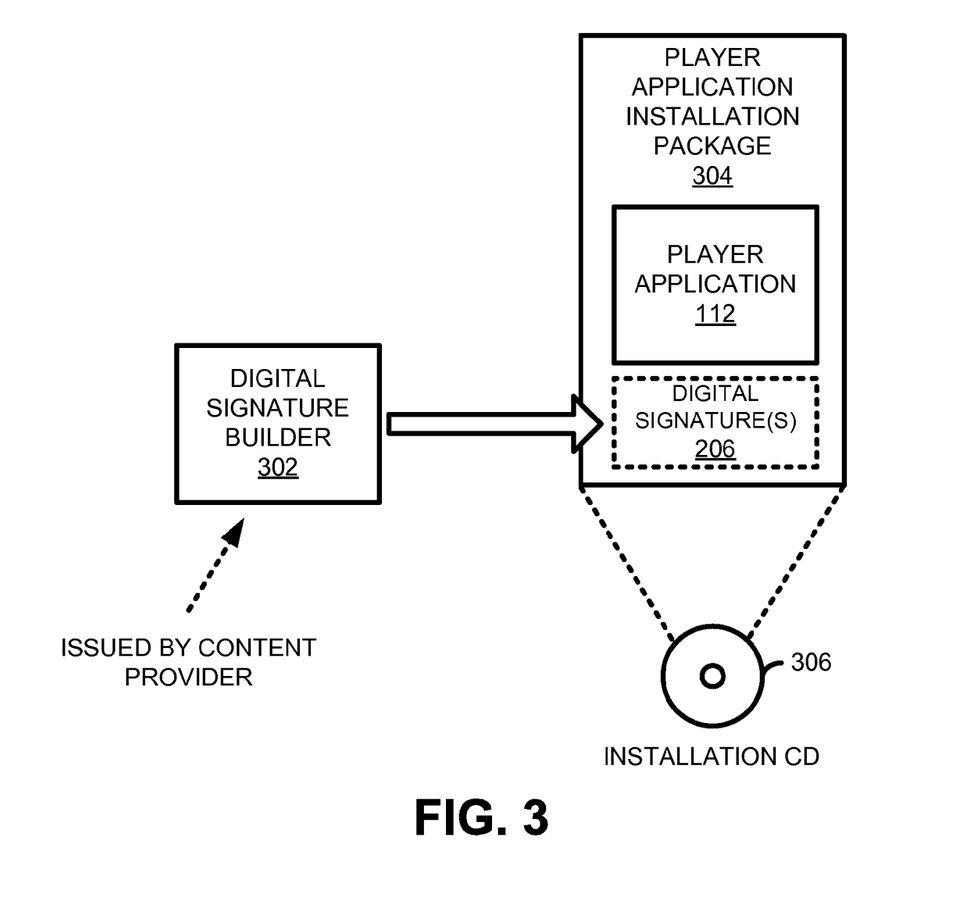
FIG. 3 depicts a digital signature builder for generating the digital signature shown in FIG. 2A-C.

Referring briefly to FIG. 3, a digital signature builder 302 is used to generate the digital signature 206 using, for example, a checksum algorithm or one of the algorithms described earlier. Generally, the signature builder 302 will be issued by a content provider or an entity seeking to control access to content stored in conjunction with the verification application 116. In this regard, the content provider also provides the verification application 116. Upon being created, the digital signature 206 is bundled with the player application 112 in a player application installation package 304, which may be distributed via an installation CD 306 or other means.

Upon installation of the player application 112 onto a viewing apparatus 102, the digital signature 206 containing the file designations is copied to a predetermined memory location on the viewing apparatus 102 for later verification. Note that if this digital signature 206 is somehow tampered with and embedded in another viewing apparatus 102 with another player application 112 installed, the file designations in the digital signature 206 will not align with files in that viewing apparatus 102. Accordingly, access to the protected content will be denied.

For some embodiments, the digital signature 206 may be embedded into certain installation files. In one implementation, the digital signature 206 may be appended to one or more files. In other implementations, the digital signature 206 may be stored as a separate file. The digital signature 206 is signed and recognized by the verification application 116 as the digital signature is created using the signature builder 302 discussed above. As emphasized earlier, in accordance with various embodiments, digital signatures may be generated based on disk files, image files, or a combination of both. By way of illustration, the contents of a digital signature 206 may comprise the following disk file designations and image file designations.

| (file #1) player.exe | disk file designation = 0x1357 | image file designation = 0x2468 |
| (file #2) decoder.dll | disk file designation = 0x4096 | image file designation = 0x1024 |
| (file #3) nav.dll | disk file designation = 0x1111 | image file designation = 0x2222 |

In the example above, three files (player.exe, decoder.dll, and nay.dll) have been selected to form the digital signature 206. The corresponding disk file designations and image file designations are also shown. In this nonlimiting example, checksum values are utilized. In particular, the checksum values above (e.g., 0x1357, 0x2468) represent the disk file designation and the image file designation. In other embodiments, the disk file designations and image file designations can be created by hash values or predetermined constants. Algorithms for calculating hash values may include SHA1 or MD5 or other algorithms.

Figure 2B:
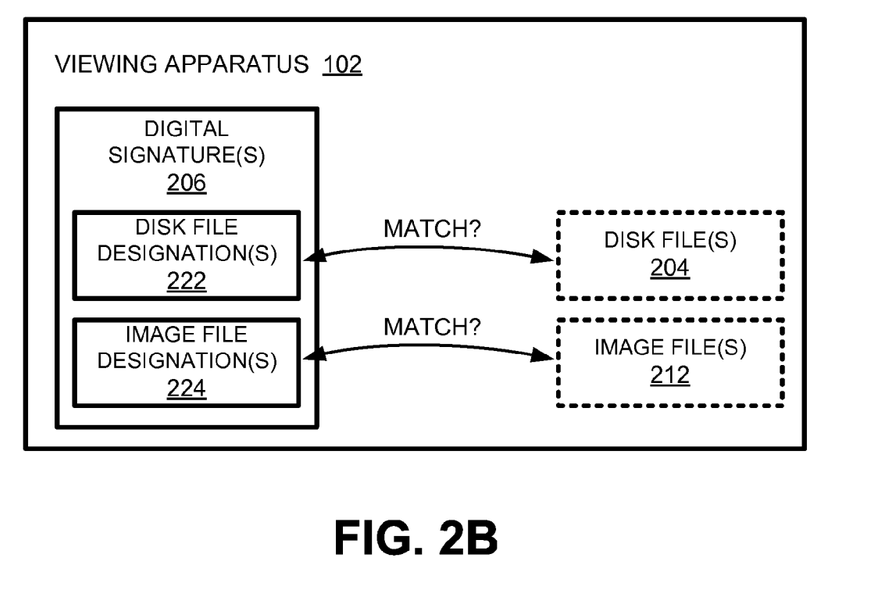

The verification application 116 first loads an entry (e.g., player.exe; file designation=0x1357; image designation=0x2468). The protection interface 114 then maps the file designations in the entry to corresponding files in the viewing apparatus 102 and a determination is made on whether the corresponding files match the file designations, as illustrated in FIG. 2B. For example, if the file designation 0x1357 and image designation 0x2468 map to a file other than "player.exe," then a determination is made by the verification application 116 that the player application 112 is unauthorized as the digital signature 206 may have been hacked. It should be appreciated that while a single digital signature 206 is discussed, a plurality of digital signatures may also be implemented. It is understood that all such variations are within the scope of the present disclosure.

For embodiments involving use of predetermined constants, the file designations may comprise an offset (e.g., memory location) to a predetermined constant embedded in the disk file or the image file. The predetermined constant may be predefined or specified, for example, by an issuer of the BD+ program and embedded into the verification application 116. As a nonlimiting example involving a predetermined constant, suppose a predetermined constant with a value of 0x100 is defined. This constant is placed into a location within a disk or image file on the viewing apparatus 102. For this example, suppose that the predetermined constant is embedded within the file "decoder.dll" at the location 0x3759. The location 0x3759 will be used to retrieve the constant value for comparison purposes. Since a constant value (e.g., 0x100) is being utilized, the designation list file may contain the following entry:

decoder.dll 0x3759

The verification application 116 contained in the storage medium 120 will contain the predetermined constant value 0x100. During the authentication process, the verification application 116 will send a request to the protection interface 114 on the viewing apparatus 102 to map the file "decoder.dll," as described in more detail below. As part of the mapping process, the protection interface 114 reads the value stored at 0x3759 on the viewing apparatus 102. The verification application 116 then determines whether the value is equal to 0x100. If the value is equal to 0x100, this indicates that the player application 112 on the viewing apparatus 102 is authorized to access the protected content.

Referring back to the checksum and hash function implementations described earlier, it should be noted that the checksum and hash function implementations read entire files, whereas embodiments utilizing a predetermined constant read only a block of data. Furthermore, the checksum and hash function implementations perform an intermediate calculation for comparison purposes, whereas no additional calculation is needed when a predetermined constant is used. As such, checksum and hash function implementations compare calculated values, and implementations involving a predetermined constant simply read the value stored at a specified location (e.g., 0x3759) for comparison purposes. The examples provided above are merely illustrative and should not be construed as implying any limitations upon the scope of the present invention.

Referring back to FIG. 2A, the verification application 116 sends a verification request 214 to the viewing apparatus 102 and specifically, to the protection interface 114, in order to determine whether the player application 112 is an authorized player. Upon receiving the verification request 214, the protection interface 114 reads the digital signature 206 stored in the viewing apparatus 102. In some cases, the digital signature 206 may be stored in a mass storage device 202 such as a hard disk drive.

Figure 2C:
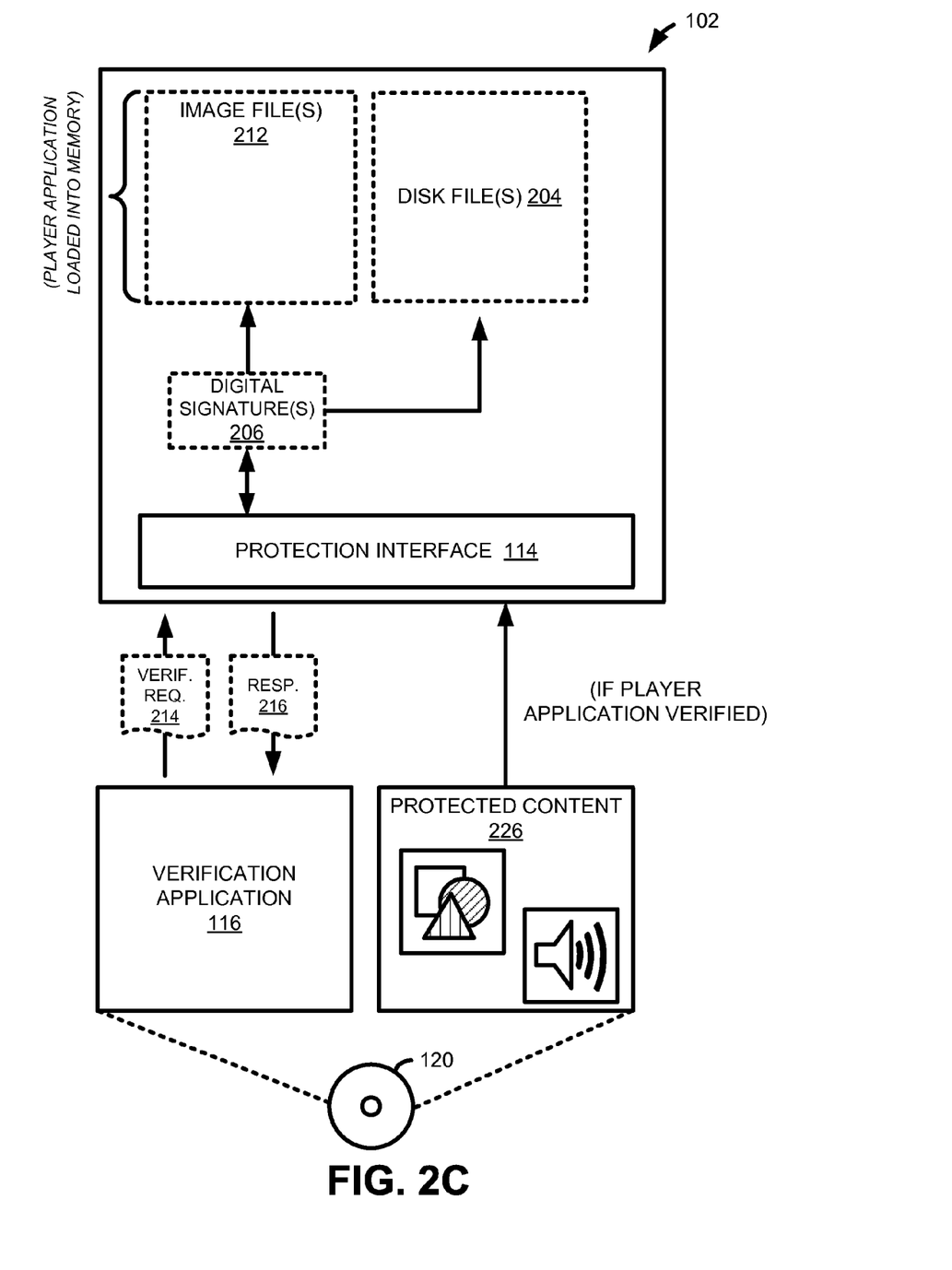

As depicted in FIG. 2B, based on the one or more disk file designations 222 and one or more image file designations 224 specified by the digital signature 206, the protection interface 114 provides a mapping to one or more corresponding disk files 222 and one or more corresponding image files 224. The mapping information may be sent back to the verification application 116 in a response 216. A determination is made on whether the file designations 222, 224 match their corresponding files 204, 212. If the file designations 222, 224 match their corresponding files 204, 212, then the digital signature 206 stored in the viewing apparatus 102 is valid and the player application 112 is authorized. The player application 112 can then access the protected content 226, as depicted in FIG. 2C.

For implementations where only disk files 204, rather than image files 212 or a combination of both disk files 204 and image files 212, are utilized to generate the digital signature 206, the memory locations of the disk files 204 are recorded in a file such as a digital signature 206. The digital signature builder 302 encrypts this digital signature 206. The digital signature 206 is later loaded by the protection interface 114, and the verification application 116 verifies and decrypts the digital signature 206. The verification application 116 then sends a request to the protection interface 114 to map the file designations 222 to respective disk files based on the memory locations specified in the digital signature 206. If the memory locations point to disk files 204 that match the file designations 222 specified in the digital signature 206, a determination is made that the player application 112 is an authorized player.

Figure 4:
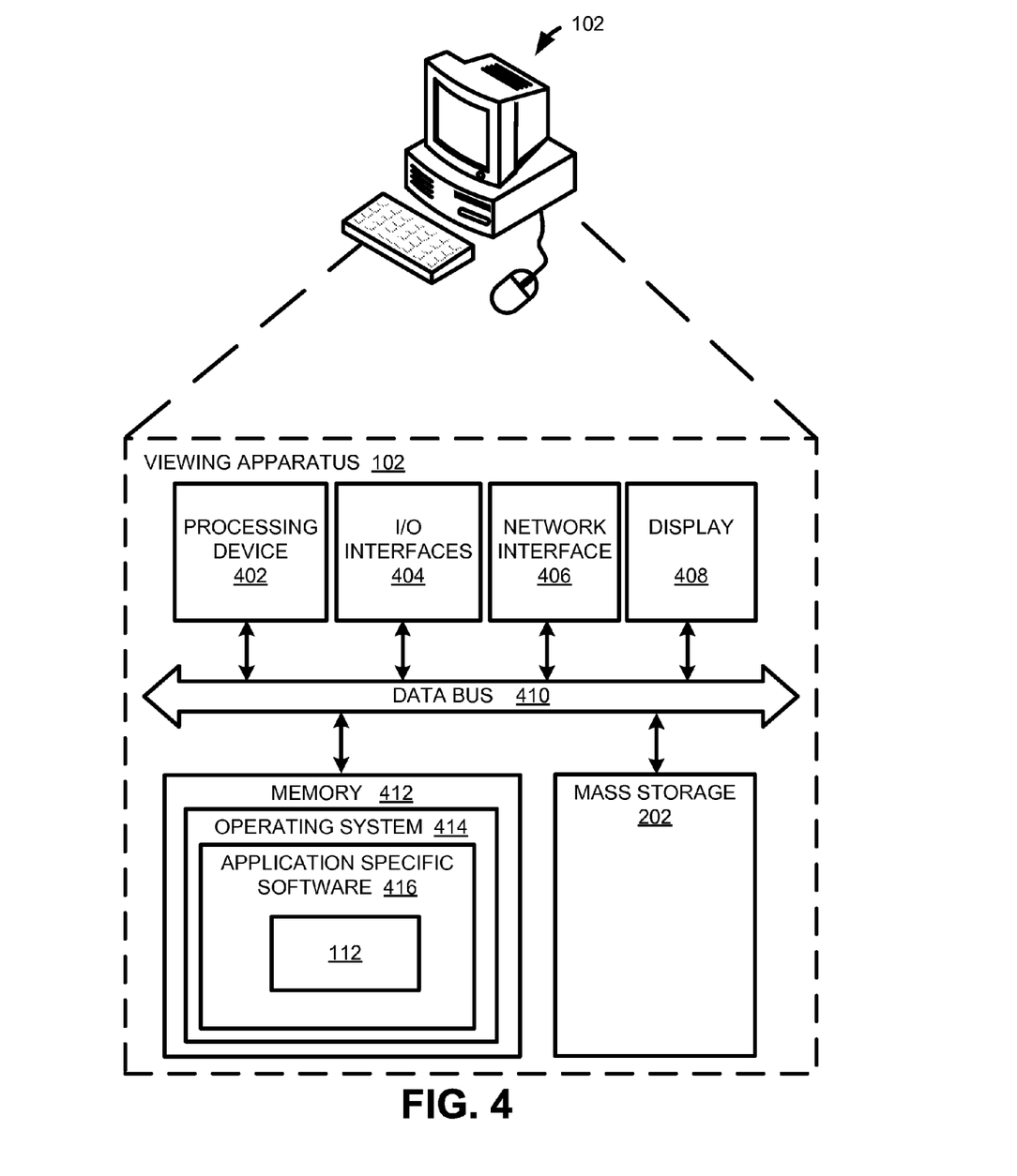
FIG. 4 illustrates an embodiment of the viewing apparatus shown in FIG. 1 for executing the player application.

Reference is now made to FIG. 4, which illustrates an embodiment of the viewing apparatus 102 shown in FIG. 1 for receiving the storage medium 120 storing the verification application 116. Generally speaking, the viewing apparatus 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, viewing apparatus 102 can, for instance, comprise memory 412, a processing device 402, a number of input/output interfaces 404, a network interface 406, a display 408, and mass storage 202, wherein each of these devices are connected across a data bus 410.

Processing device 402 can include any custom made or commercially available processor, a central processing unit (CPU) or an auxiliary processor among several processors associated with the viewing apparatus 102, a semiconductor based microprocessor (in the form of a microchip), one or more application specific integrated circuits (ASICs), a plurality of suitably configured digital logic gates, and other well known electrical configurations comprising discrete elements both individually and in various combinations to coordinate the overall operation of the computing system.

The memory 412 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 412 typically comprises a native operating system 414, one or more native applications, emulation systems, or emulated applications for any of a variety of operating systems and/or emulated hardware platforms, emulated operating systems, etc. For example, the applications may include application specific software 416 stored on a computer readable medium for execution by the processing device 402 and may include the player application 112 depicted in FIG. 1. One of ordinary skill in the art will appreciate that the memory 412 can, and typically will, comprise other components which have been omitted for purposes of brevity.

Input/output interfaces 404 provide any number of interfaces for the input and output of data. For example, where the viewing apparatus 102 comprises a personal computer, these components may interface with user input device 404, which may be a keyboard or a mouse, as shown in FIG. 1. Where the viewing apparatus 102 comprises a handheld device (e.g., PDA, mobile telephone), these components may interface with function keys or buttons, a touch sensitive screen, a stylist, etc. Display 408 can comprise a computer monitor or a plasma screen for a PC or a liquid crystal display (LCD) on a hand held device, for example.

In the context of this disclosure, a "computer-readable medium" stores the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

With further reference to FIG. 4, network interface device 406 comprises various components used to transmit and/or receive data over a network environment. By way of example, the network interface 406 may include a device that can communicate with both inputs and outputs, for instance, a modulator/demodulator (e.g., a modem), wireless (e.g., radio frequency (RF)) transceiver, a telephonic interface, a bridge, a router, network card, etc.). The viewing apparatus 102 may further comprise mass storage 202. For some embodiments, the mass storage 202 may include a database 428 to store and manage data. Such data may comprise, for example, editing files which specify special effects for a particular movie title.

Figure 5:
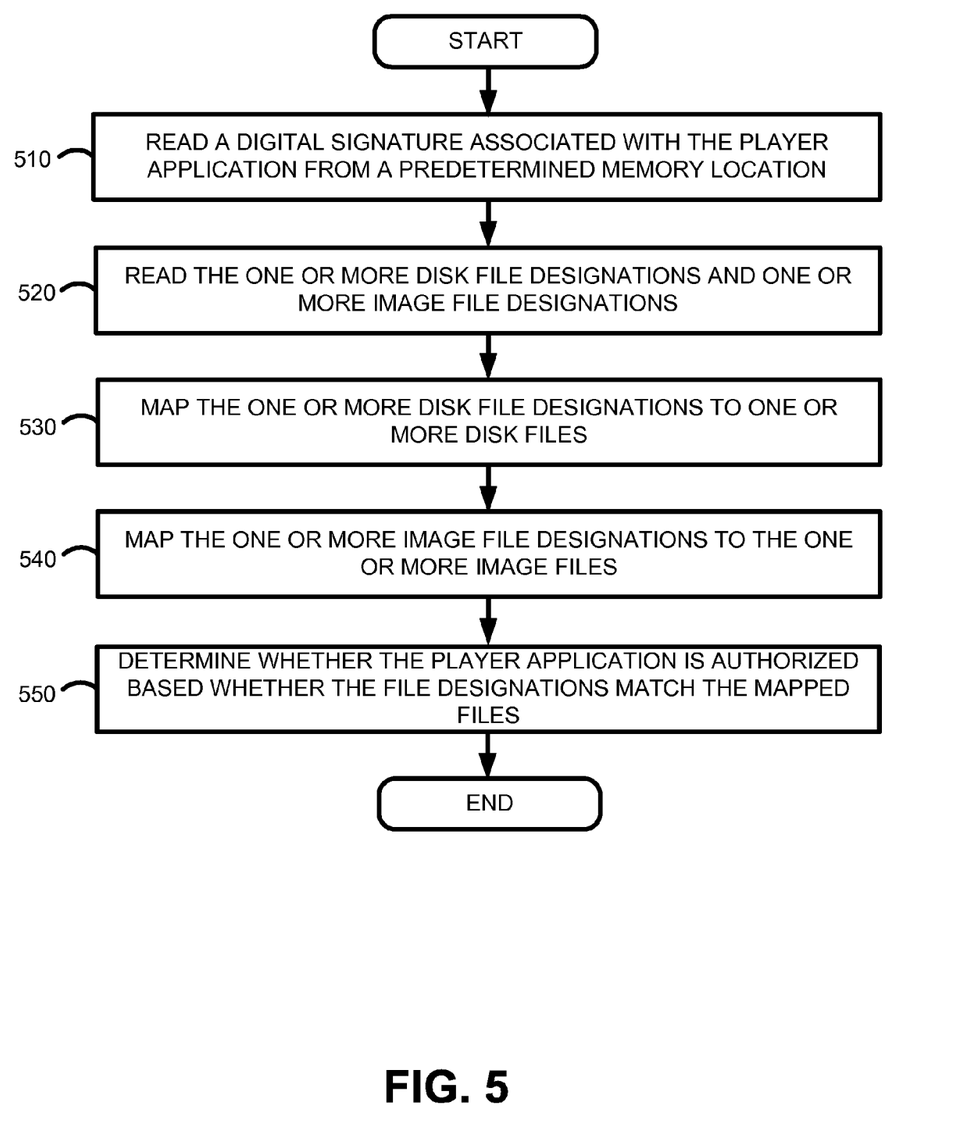
FIG. 5 depicts a flowchart for a method according to an embodiment of the present disclosure for determining whether a player application is authorized to play protected content.

Reference is made to FIG. 5, which is flowchart of a method for determining whether a player application is authorized to play protected content. Beginning in block 510, a digital signature associated with the player application is read from a predetermined memory location. As outlined above, a determination is made on whether the player application 112 is authorized to play the protected content 226 based on the digital signature 206, wherein the digital signature 206 contains one or more disk file designations 222 and one or more image file designations 224.

In block 520, the one or more file designations 222 and one or more image file designations 224 are read from the digital signature 206. In blocks 530-540, these file designations 222, 224 are then mapped to corresponding files 204, 212. In block 550, a determination is made on whether play application 112 is an authorized player based on whether the file designations 222, 224 match the mapped files 204, 212.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for determining whether a player application is authorized to play protected content, comprising:
   reading a digital signature bundled with the player application from a predetermined memory location using a protection interface associated with the player application, wherein the digital signature comprises one or more file designations of a disk file and an image file comprising at least one memory block loaded from the disk file for execution;
   mapping, by the protection interface, the one or more file designations to one or more files associated with the player application to generate mapping information; and
   transmitting the mapping information from the protection interface to a verification application stored on a storage medium, wherein the verification application is configured to determine whether the player application is authorized to play the protected content if the one or more file designations match the one or more files based on the mapping information.

2. The method of claim 1, wherein the storage medium comprises a Blu-ray disc.

3. The method of claim 1, wherein the file designations comprise at least one of:
   one or more disk file designations; and
   one or more image file designations,
   wherein the files comprise one at least one of:
   one or more disk files; and
   one or more image files.

4. The method of claim 3, wherein mapping the one or more file designations to one or more files further comprises mapping the one or more disk file designations to one or more disk files associated with the player application.

5. The method of claim 4, wherein mapping the one or more file designations to one or more files further comprises mapping the one or more image file designations to one or more image files associated with the player application.

6. The method of claim 5, further comprising at least one of:
   determining whether the one or more disk file designations match the one or more disk files; and
   determining whether the one or more image file designations match the one or more image files.

7. The method of claim 6, wherein determining whether the one or more disk file designations and the one or more image file designations match one or more disk files and one or more image files associated with the player application comprises:
   at the verification application,
      calculating one or more checksums based on at least one of the one or more disk files and the one or more image files; and
      comparing the one or more checksums with at least one of the one or more disk file designations and the one or more image file designations; and
      determining whether the player application is authorized to access the media content based on the step of comparing.

8. The method of claim 7, wherein the non-volatile memory comprises hard disk memory, and wherein the volatile memory comprises random access memory (RAM).

9. The method of claim 3, wherein the file designation is created by one of: hash values and predetermined constants.

10. The method of claim 3, wherein the one or more disk files are stored in non-volatile memory, and wherein the one or more image files are stored in volatile memory.

11. The method of claim 1, further comprising receiving the protected content for playback at the player application based on determining whether the player application is authorized to play the protected content.

12. A system determining whether a player application is authorized to play protected content, comprising:
   a protection interface coupled to the player application and located in a viewing apparatus, wherein the player application comprises a digital signature having one or more file designations of a disk file and an image file comprising at least one memory block loaded from the disk file for execution, and wherein the protection interface is configured to map the one or more file designations to one or more files associated with the player application; and
   a verification application stored on a non-transitory storage medium configured to send a request to the protection interface to read the digital signature from a predetermined memory location in the viewing apparatus, wherein the verification application is further configured to receive mapping information from the protection interface and determine whether the player application is authorized to access the protected content if the one or more file designations match the one or more files based on the mapping information.

13. The system of claim 12, wherein the storage medium comprises a Blu-ray disc.

14. The system of claim 12, wherein the verification application accesses the digital signature through a protection interface.

15. The system of claim 12, wherein the verification application verifies the digital signature based on files specified in the digital signature by comparing disk file designations and image file designations specified in the digital signature to one or more disk files and one or more image files associated with the player application.

16. The system of claim 15, wherein the one or more disk files are binary files comprising data files and executable files, wherein the binary files were created during installation of the player application.

17. The system of claim 15, wherein the one or more disk files are stored in non-volatile memory.

18. The system of claim 15, wherein the image files are image files of the player application when the player application is loaded into memory.

19. The system of claim 18, wherein the memory is random access memory (RAM).

20. A non-transitory computer readable medium storing a verification program for execution on a processor, the verification program comprising computer executable instructions configured to:
   request a protection interface to read a digital signature bundled with the player application from a non-volatile memory in a viewing apparatus; and determine whether a player application on the viewing apparatus is authorized to play protected content based on the digital signature, wherein the digital signature contains: one or more disk file designations of a disk file and an image file comprising at least one memory block loaded from the disk file for execution;
   wherein determining whether a player application is authorized comprises receiving mapping information from the protection interface and determining whether the player application is authorized to access the protected content if the one or more file designations match one or more files associated with the player application based on the mapping information.

21. The non-transitory computer readable medium of claim 20, wherein the mapping information is based on at least one of:
   mapping the one or more disk file designations to one or more disk files stored in non-volatile memory on the viewing apparatus; and
   mapping one or more image file designations to the one or more image files stored in volatile memory on the viewing apparatus.

22. The non-transitory computer readable medium of claim 20, wherein the one or more disk files comprise binary files created during installation of the player application, and wherein the one or more image files comprise image files of the player application stored in the volatile memory.

23. The non-transitory computer readable medium of claim 20, wherein the non-volatile memory comprises hard disk memory, and wherein the volatile memory comprises random access memory (RAM).

24. The non-transitory computer readable medium of claim 20, wherein the verification program further comprises computer executable instructions configured to determine whether the at least one of one or more disk file designations match␣the at least one of one or more disk files and one or more image files associated with the player application.

25. The non-transitory computer readable medium of claim 20, wherein the verification program further comprises computer executable instructions configured to allow access by the player application to media content stored on the computer readable medium based on the step of determining.

* * * * *